E. A. MOUCHE.
INCLINABLE TOOL OR SAW.
APPLICATION FILED JULY 14, 1919.

1,325,900.

Patented Dec. 23, 1919.

Inventor
E. A. Mouche
by
W. E. Evans:
Attorney.

UNITED STATES PATENT OFFICE.

EMILE AUGUSTE MOUCHE, OF LYON, FRANCE.

INCLINABLE TOOL OR SAW.

1,325,900.     Specification of Letters Patent.     Patented Dec. 23, 1919.

Application filed July 14, 1919. Serial No. 310,837.

*To all whom it may concern:*

Be it known that I, EMILE AUGUSTE MOUCHE, a citizen of the French Republic, residing at 61 Rue de Bonnel, Lyon, France, have invented certain new and useful Improvements Relating to Inclinable Tools or Saws, of which the following is a specification.

This invention relates to improvements in or modifications of the construction described in the specification of the prior Patent No. 1244231, 23rd October 1917.

The apparatus of the principal patent serves more particularly for making grooves in wood. The present invention relates to the application of the apparatus for working on metals. For this purpose the inclined tool or saw is made more rigid in rendering it solid with the upper plate, by means of screws disposed in the plane of the axes of the pivots upon which the tool or saw oscillates.

In the accompanying drawing.

Figure 1:
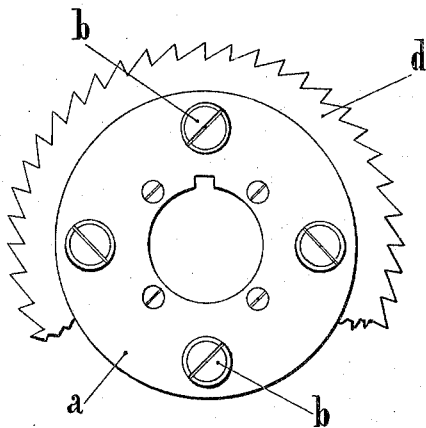
Figure 1 is a plan view of a saw constructed according to the invention.
Figure 2:
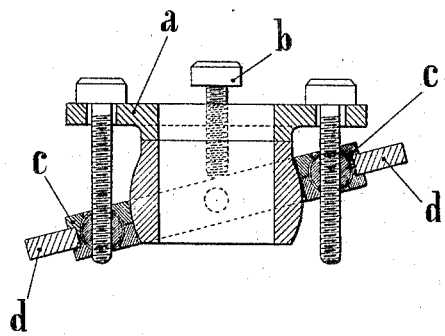
Fig. 2 is a corresponding sectional view.
Figure 3:
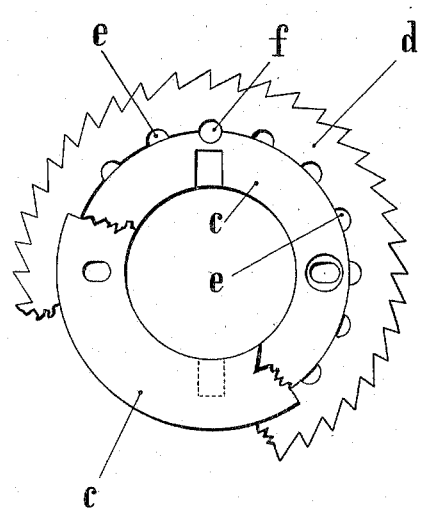
Fig. 3 illustrates details of construction.

In the upper plate $a$ are screwed two screws $b$, which traverse the plate and are applied tightly against the crown $c$ on which is mounted the inclinable saw. By this means the rigidity of the saw is considerably augmented whereby it becomes solid with the upper plate, and vibrations are avoided.

For assuring the regular wear of different parts of the edge of the saw, its inner peripheral face is provided with a series of transverse recesses $e$, which may be turned at will to register with another transverse recess provided on the outer periphery of the crown, and the whole is rigidly locked together by means of a pin or screw passing through the alined recesses $e\ f$, whereby the saw $d$ is rendered solid with the crown.

Instead of a saw any similar tool may be used such as a milling cutter, or the tool or saw may be provided with lateral cutting teeth.

I claim:

1. An inclinable tool or saw according to the prior Patent No. 1244231, in which means are provided to augment the rigidity of the tool or saw, consisting of screws in contact with the crown and disposed in the plane of the axes of the pivots of the oscillating crown for the purpose and substantially as described.

2. An inclinable tool or saw according to claim 1, in which means are provided for securing the tool or saw upon its crown in varying positions, substantially as described.

EMILE AUGUSTE MOUCHE.

Witnesses:
   ORVIS GUILLON,
   MARIN VACHON.